US011679395B2

United States Patent
Nguyen et al.

(10) Patent No.: US 11,679,395 B2
(45) Date of Patent: Jun. 20, 2023

(54) POWER-LINE CONTROL OF A HAZARDOUS-ENVIRONMENT-LOCATED MACHINE FROM A SAFE ENVIRONMENT

(71) Applicant: Graco Minnesota Inc., Minneapolis, MN (US)

(72) Inventors: Vu K. Nguyen, Brooklyn Park, MN (US); Tom Herbert, Dayton, MN (US)

(73) Assignee: GRACO MINNESOTA INC., Minneapolis, MN (US)

(*) Notice: Subject to any disclaimer, the term of this patent is extended or adjusted under 35 U.S.C. 154(b) by 176 days.

(21) Appl. No.: 16/949,274

(22) Filed: Oct. 22, 2020

(65) Prior Publication Data

US 2021/0121895 A1 Apr. 29, 2021

Related U.S. Application Data (60) Provisional application No. 62/925,017, filed on Oct. 23, 2019.

(51) Int. Cl.
*H04B 3/54* (2006.01)
*H05K 5/02* (2006.01)
*B04B 7/02* (2006.01)
*B04B 5/04* (2006.01)

(52) U.S. Cl.
CPC .............. *B04B 7/02* (2013.01); *B04B 5/0407* (2013.01); *H04B 3/542* (2013.01); *H05K 5/02* (2013.01)

(58) Field of Classification Search
None
See application file for complete search history.

(56) References Cited

U.S. PATENT DOCUMENTS

| 3,897,887 | A | 8/1975 | Goldberg |
| 5,656,089 | A * | 8/1997 | Rouvelin ............... B05B 12/00 118/696 |
| 7,327,221 | B1 * | 2/2008 | Callaghan ............. H04B 3/542 340/12.32 |

(Continued)

FOREIGN PATENT DOCUMENTS

| CN | 209631448 U | * 11/2019 |
| EP | 2634925 A1 | 9/2013 |

OTHER PUBLICATIONS

Extended European Search Report dated Mar. 25, 2021, received for corresponding European Application No. 20203389.0, 7 pages.

*Primary Examiner* — Curtis A Kuntz
*Assistant Examiner* — Jerold B Murphy
(74) *Attorney, Agent, or Firm* — Kinney & Lange, P.A.

(57) ABSTRACT

Apparatus and associated methods related to providing safe electrical control and/or communication between a remote controller located in a safe location and interface system for a machine located in a hazardous location. The control and/or communication is provided via industrial-voltage power lines that traverse a barrier separating the safe location from the hazardous location. Control and/or communication is provided by reactively coupling to industrial power lines, which traverse the barrier, so as to superimpose a control and/or communication signal upon AC operating power provided to the machine. Each of the interface system located at the hazardous location and the remote control module located at a safe location provides such reactive coupling to the industrial-voltage power lines so as to communicate therebetween.

20 Claims, 5 Drawing Sheets

(56) References Cited

U.S. PATENT DOCUMENTS

| | | |
|---|---|---|
| 8,638,216 B2 | 1/2014 | Lamon et al. |
| 2005/0240541 A1 | 10/2005 | Giacaman |
| 2006/0145833 A1 | 7/2006 | Brandt et al. |
| 2009/0045925 A1* | 2/2009 | Demin ................. B67D 7/3236 |
| | | 340/12.32 |
| 2011/0071691 A1 | 3/2011 | Bergeron |
| 2014/0031955 A1 | 1/2014 | Raabe et al. |
| 2014/0034562 A1 | 2/2014 | Wallace |
| 2014/0195174 A1 | 7/2014 | Machuga |
| 2015/0355258 A1* | 12/2015 | Guo ........................ E21F 17/06 |
| | | 324/509 |
| 2019/0099631 A1 | 4/2019 | Hart et al. |

* cited by examiner

POWER-LINE CONTROL OF A HAZARDOUS-ENVIRONMENT-LOCATED MACHINE FROM A SAFE ENVIRONMENT

BACKGROUND

Some industries require work to be performed in hazardous locations that have atmospheres containing dangerous concentrations of flammable gases or dust. For example, such hazardous locations can be found in industrial locations where industrial paint and fluid handling systems are used. Such flammable gases and dust can be ignited by providing heat or electrical sparks sufficient to ignite the explosive atmospheres.

The International Electrotechnical Commission (IEC) is an international organization that has promulgated various standards of safety for conducting operations in such hazardous locations. Such standards include IEC 60079-0, IEC 60079-1, IEC 60079-11 and IEC 60079-25, which are hereby incorporated by reference. Additional standards for North America include UL 1203, CSA 22.2 No. 30, FM 3615. Hazardous locations are defined by the IEC as "hazardous areas". A hazardous area is an "area in which an explosive atmosphere is present, or may be expected to be present, in quantities such as to require special precautions for the construction, installation and use of electrical apparatus." (See e.g., IEC 60079-0, definition 3.2). An explosive atmosphere is a "mixture with air, under atmospheric conditions, of flammable substances in the form of gas, vapour, dust, fibres, or flyings which, after ignition, permits self-sustaining propagation." (See e.g., IEC 60079-0, definition 3.30). A flameproof enclosure is defined as an enclosure that "can withstand the pressure developed during an internal explosion of an explosive mixture, and which prevents the transmission of the explosion to the explosive gas atmosphere surrounding the enclosure. (See e.g., IEC 60079-1). Other standards promulgated similarly define enclosures as being explosion proof. Herein, explosion proof and flameproof are used interchangeably.

Electrical equipment that is operated at such hazardous locations can present such risks of ignition of the flammable gases or dust. Various methods can be used to guard against ignition of such explosive atmospheres. These include using explosive-proof chambers, immersion of electrical equipment in oil or sand, safe design of electrical equipment, and others. Safe design of such electrical equipment to guard against these risks is termed Intrinsic Safety (IS). Electrical equipment designed with Intrinsic Safety (IS) considerations limit the energy, electrical and thermal, available for ignition of the explosive atmospheres. Intrinsic safety is defined as a "type of protection based on the restriction of electrical energy within equipment and of interconnecting wiring exposed to the explosive atmosphere to a level below that which can cause ignition by either sparking or heating effects." (See e.g., IEC 60079-11, definition 3.1.1).

In normal operation, some electrical equipment can create electric arcs, for example, in switches, motor brushes, connectors, and in other places. Electrical equipment also can generate heat, which in some circumstances can become an ignition source. Even if equipment, in normal operation, doesn't generate ignition sources, various component failures can render such equipment as having the potential to produce such ignition sources. For example, if a component fails in a short-circuit or an open-circuit manner, circuitry that was previously incapable of producing an ignition source can become capable of producing such a source.

Thus, communication with and control of equipment across the safe/hazardous barrier should be performed in accordance with the safety standards so as to maintain the safe operation of the equipment located in the hazardous location.

SUMMARY

Apparatus and associated methods relate to a system for interfacing with a hazardous-environment-located machine. The system includes an explosion-proof housing, a reactive coupler, a communications interface, and a local interface. The reactive coupler is located within the explosion-proof housing. The reactive coupler is configured to reactively couple to an industrial-voltage power-line conductor providing AC operating power of a line frequency to the hazardous-environment-located machine. The communications interface is located within the explosion-proof housing and electrically coupled to the reactive coupler. The communications interface is configured to receive control signals of frequencies within a communication frequency band from the industrial-voltage power-line conductor via the reactive coupler, and to generate operating signals for the hazardous-environment-located machine based on the received control signals. The local interface is electrically coupled to the communications interface and configured to couple to the hazardous-environment-located machine so as to provide the generated operating signals thereto.

DETAILED DESCRIPTION

Apparatus and associated methods related to providing safe electrical control and/or communication between a remote controller located in a safe location and interface system for a machine located in a hazardous location. The control and/or communication is provided via industrial-voltage power-line conductors that traverse a barrier separating the safe location from the hazardous location. Control and/or communication is provided by reactively coupling to industrial power lines, which traverse the barrier, so as to superimpose a control and/or communication signal upon AC operating power signals provided to the machine. Each of the interface system located at the hazardous location and the remote control module located at a safe location provides such reactive coupling to the industrial-voltage power-line conductors so as to communicate therebetween. Herein, electrical parameters pertaining to industrial-voltage power-line conductors include voltage amplitudes between 50 and 1000 voltages, between 120 and 480 volts, or between 240 and 480 volts, for example.

Figure 1:
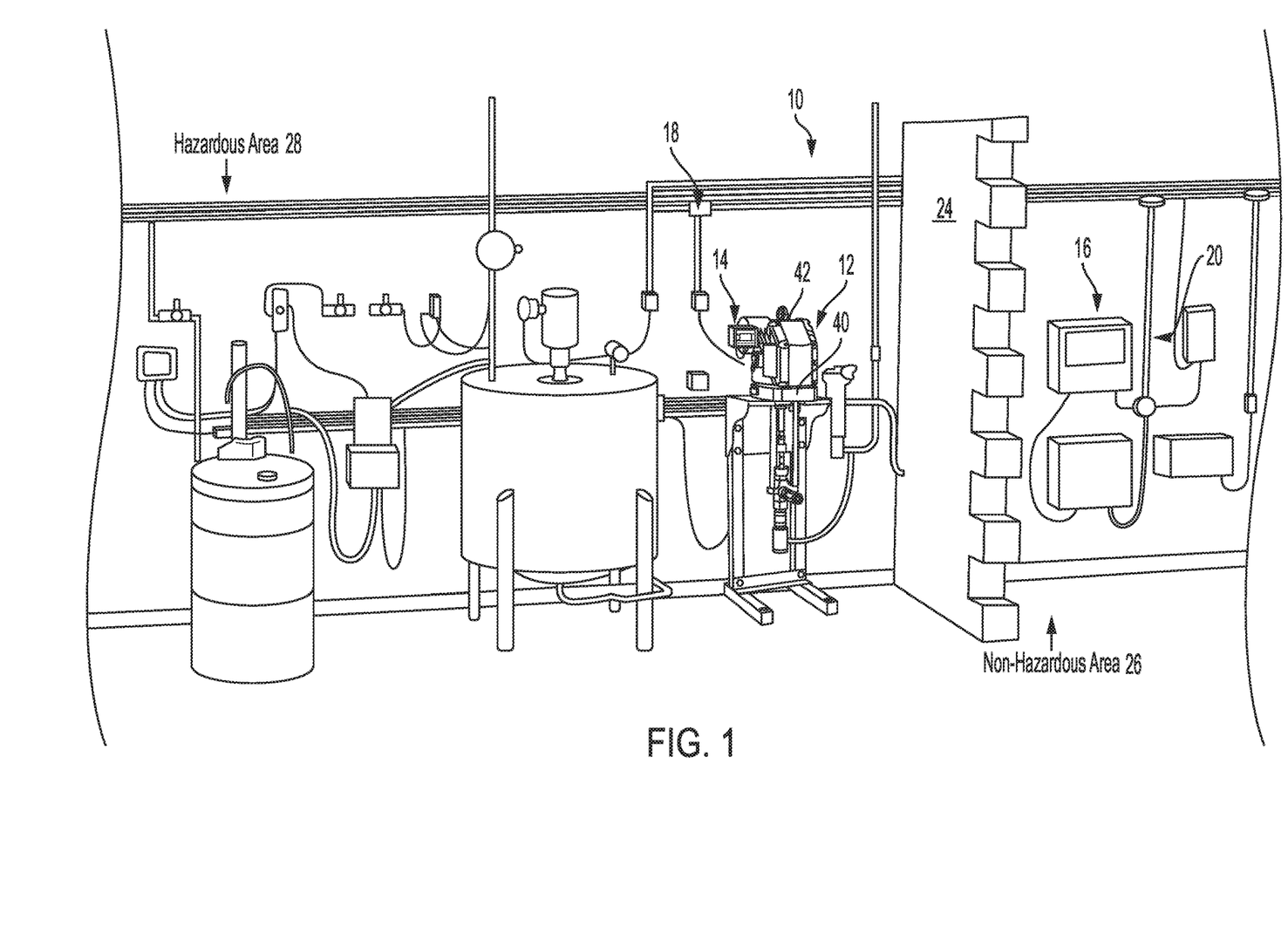
FIG. 1 is a perspective view of an industrial system including a machine located in a hazardous-environment area controlled by a remote controller located in a non-hazardous environment area.

FIG. 1 is a perspective view of an industrial system including a machine located in a hazardous-environment area controlled by a remote controller located in a safe-environment area. In FIG. 1, industrial system 10 includes machine 12 with machine interface 14, remote controller 16 and explosion proof conduit 18, within which runs industrial-voltage power-line conductors 20. Remote controller 16 is located in safe-environment area 26, while machine 12 and machine interface 14 are located in hazardous-environment area 28. Safe-environment area 26 and hazardous-environment area 28 are separated from one another via isolation barrier 24.

Industrial-voltage power-line conductors 20 traverse isolation barrier 24 so as to form a conductive electrical path between machine interface 14 and remote controller 16. Therefore, industrial-voltage power-line conductors can not only provide industrial-voltage electrical power to machine 12 and machine interface 14, but can be used as a communications channel between machine interface 14 and remote controller 16.

In the FIG. 1 embodiment, machine interface 14 and machine 12 are separate units. In hazardous-environment area 28, electronic circuits of machine 12 and machine interface 14 are contained within explosion-proof housings. Explosion-proof conduit 18 and the explosion-proof housings of machine 12 and machine interface 14 connect to one another via explosion-proof connections. Such explosion-proof housings and conduit thereby form and explosion-proof system that isolates the electrical circuitry and wiring inside from the hazardous environment outside.

Figure 2:
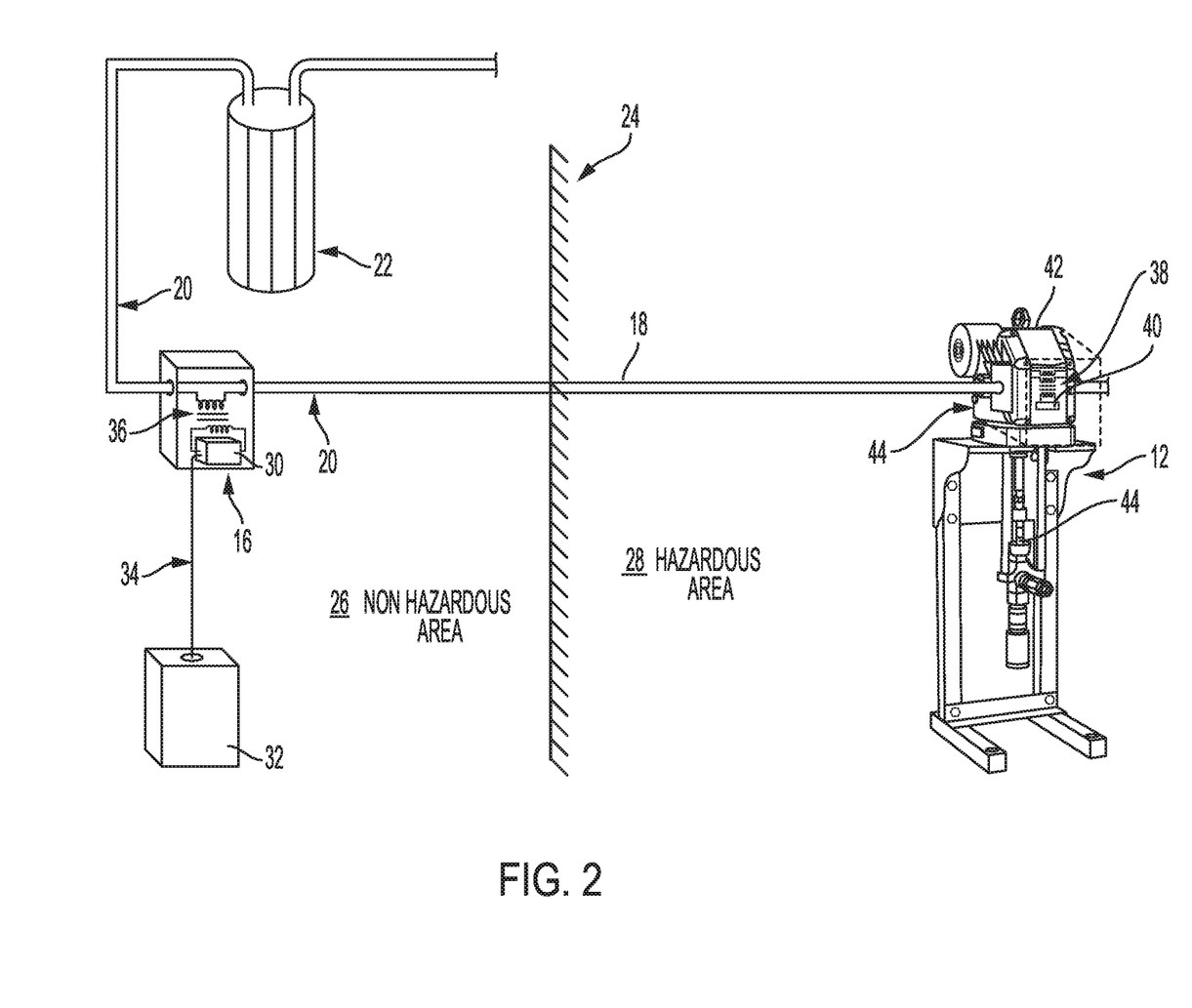
FIG. 2 is a schematic drawing of an industrial system including a machine located in a hazardous-environment area controlled by a remote controller located in a safe-environment area.

FIG. 2 is a schematic drawing of an industrial system including a machine located in a hazardous-environment area controlled by a remote controller located in a safe-environment area. In FIG. 2, industrial system 10 includes machine 12 with machine interface 14, remote controller 16 and explosion proof conduit 18, within which runs industrial-voltage power-line conductors 20, which conducts industrial-voltage AC power provided by industrial-voltage power source 22. Industrial-voltage power source 22 can be a local transformer, a regional power sub-station, or a power plant, for example. Industrial-voltage power source 22 provides AC operating power to hazardous-environment-located machine 12 via industrial-voltage power-line conductors 20. Industrial-voltage power-line conductors 20 extend from industrial-voltage power source 22 to hazardous-environment-located machine 12. To extend therebetween, industrial-voltage power-line conductors 20 traverse barrier 24 separating safe-environment area 26 from hazardous-environment area 28.

Industrial-voltage Power-line conductors 20 conduct AC operating power from industrial-voltage power source 22 to hazardous-environment-located machine 12. Power-line conductors also conduct various communication signals between remote controller 16 and machine interface 14. For example, remote controller 16 can send various control signals to machine interface 14 via industrial-voltage power-line conductors 20, and/or machine interface 14 can send various information signals to remoter controller 16. Remote controller 16 has first communications interface 30 connected to industrial programmable computer 32 via industrial control network 34. First communications interface 30 can receive/transmit various control signals from/to industrial programmable computer 32 and other network connected devices via industrial control network 34. For example, industrial programmable computer 32 can be programmed to control operation of hazardous-environment-located machine 12 as well as other machines connected via industrial-voltage power-line conductors 20.

Such operation of hazardous-environment-located machine 12 can be controlled using a series of network control signals that are sent to remote controller 16 where they are received by first communications interface 30. First communications interface 30 determines if the received network control signal is intended for hazardous-environment-located machine 12. If so, first communications interface 30 converts the received network control signals to machine control signals of frequencies within a communication frequency band. These machine control signals are reactively coupled to industrial-voltage power-line conductors 20 via first reactive coupler 36, thereby superimposing the machine control signals onto the AC operating power signal.

The machine control signal conducted by industrial-voltage power-line conductors 20 is conducted to machine interface 14. Machine interface 14 has second reactive coupler 38 and second communications interface 40. Second reactive coupler provides reactive coupling between industrial-voltage power-line conductors 20 and second communications interface 40 within explosion-proof housing 42. Second communications interface 40 can receive the machine control signals from industrial-voltage power-line conductors 20 via second reactive coupler 38. Second communications interface 40 can generate machine operating signals for the hazardous-environment-located machine based on the received machine control signals. Second communications interface 40 sends the machine operating signals to hazardous-environment-located machine 12 via local machine control network 44. In the FIG. 2 embodiment, machine interface 14 is integral within machine 12. A single explosion-proof housing—explosion proof housing 42—can be used for both machine 12 and machine interface 14 using such an integral system.

In some embodiments, machine interface 14 can also send communications to remote controller 16. Such communications can include information signals, such as signals indicative of sensed operating parameters. In some embodiments, such information signals can be sent in response to second communications interface receiving a request for information command from remote controller 16. In some embodiments, such information signals can include signals indicative of various alarm conditions.

Figure 3:
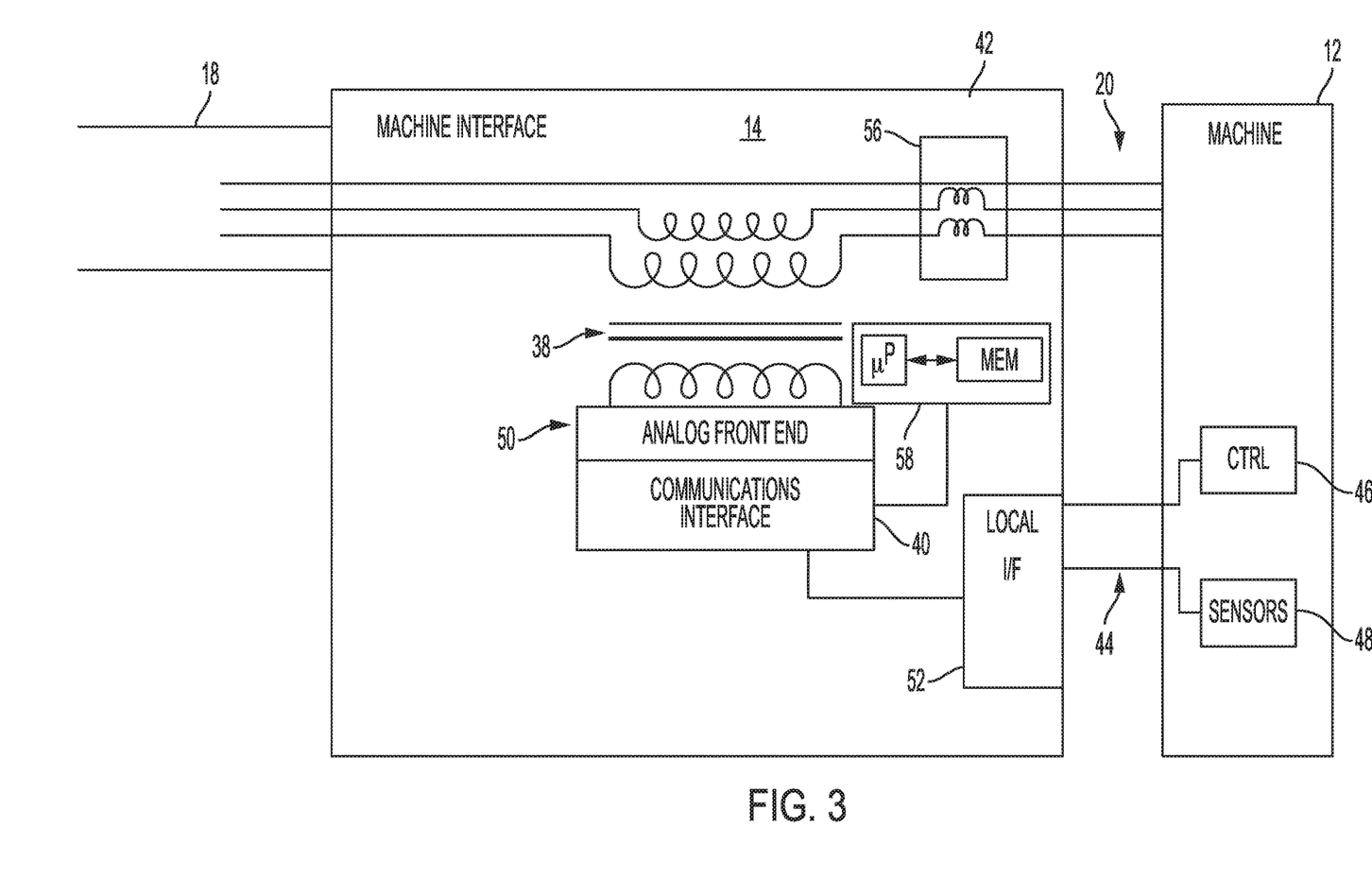
FIG. 3 is a block diagram of an embodiment of a system for interfacing with a hazardous-environment-located machine.

FIG. 3 is a block diagram of an embodiment of a system for interfacing with a hazardous-environment-located machine. In FIG. 3, machine interface 14 is electrically connected to hazardous-environment-located machine 12 via industrial-voltage power-line conductors 20 and local machine control network 44. Machine 12 can be any machine designed to be operated in a hazardous-environment area. For example, hazardous-environment-located machine 12 can be an electric paint pump, an electric paint agitator, or an electric paint proportioner, etc. Hazardous-environment-located machine 12 includes control module 46 and sensors 48.

Machine interface 14 includes reactive coupler 38, communications interface 40, analog front-end filter 50, local interface 52, isolation filter 56, and local controller 58, all housed within explosion-proof housing 42. Explosion-proof housing 42 is shown coupled to explosion-proof conduit 18. Such a coupling results in a combined explosion proof barrier that prevents an atmosphere of the hazardous environment from breaching or an internal explosion event from breaching.

Reactive coupler 38 is configured to reactively couple to industrial-voltage power-line conductors 20, which provide AC operating power of a line frequency to hazardous-environment-located machine 12. Analog front-end filter 50 filters out the line frequency of the AC industrial-voltage power provided to machine 12, while passing frequencies within the communications frequency band so as to pass machine command signals to communications interface 40. The machine control signals have frequencies within a communication frequency band. The communication frequency band does not include the line frequency of the AC operating power.

Communications interface 40 is configured to receive the machine control signals from industrial-voltage power-line conductor 20 via reactive coupler 38 and analog front-end filter 50. Communications interface 40 is further configured to generate local operating signals for hazardous-environment-located machine 12 based on the received machine control signals. Communications interface 40 sends the generated local operating signal to hazardous-environment-located machine 12 via local interface 52.

Isolation filter 56 is configured to attenuate machine control signals transmitted by industrial-voltage power-line conductors 20 so that such machine control signals do not interfere with operation of hazardous-environment-located machine 12 or provide arcing potential due to high-frequency machine control signals. In the depicted embodiment, isolation filter 56 is a combination of an inductor or a Radio Frequency (RF) choke along with one or more capacitors.

Local controller 58 includes processor(s) μP and storage memory MEM. Processor(s) μP can receive program instructions from storage memory MEM. Processor(s) μP can be configured to machine interface 14, based on the received program instructions. For example processor(s) μP can be configured to send local operation signals to machine 12 in response to the received machine command signals. Processor(s) μP also can be configured to send information signals to remote controller 16 in response to information request signals received by communications interface 40.

As illustrated in FIG. 3, machine interface 14 includes reactive coupler 38, communications interface 40, analog front-end filter 50, local interface 52, isolation filter 56, and local controller 58 with processor(s) μP and storage memory MEM. However, in certain examples, machine interface 14 can include more or fewer components. For instance, machine interface 14 can also include a user interface.

Processor(s) μP, in one example, is configured to implement functionality and/or process instructions for execution within machine interface 14. For instance, processor(s) μP can be capable of processing instructions stored in storage memory MEM. Examples of processor(s) μP can include any one or more of a microprocessor, a controller, a digital signal processor(s) (DSP), an application specific integrated circuit (ASIC), a field-programmable gate array (FPGA), or other equivalent discrete or integrated logic circuitry. Processor(s) μP can be configured to control operation of machine interface 14 as well as hazardous-environment-located machine 12.

Storage memory MEM can be configured to store information within machine interface 14 during operation. Storage memory MEM, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, storage memory MEM is a temporary memory, meaning that a primary purpose of storage memory MEM is not long-term storage. Storage memory MEM, in some examples, is described as volatile memory, meaning that storage memory MEM do not maintain stored contents when power to machine interface 14 is turned off. Examples of volatile memories can include random access memories (RAM), dynamic random access memories (DRAM), static random access memories (SRAM), and other forms of volatile memories. In some examples, storage memory MEM is used to store program instructions for execution by processor(s)μP. Storage memory MEM, in one example, is used by software or applications running on machine interface 14 (e.g., a software program implementing specific operations related to control of machine 12) to temporarily store information during program execution.

Storage memory MEM, in some examples, can also include one or more computer-readable storage media. Storage memory MEM can be configured to store larger amounts of information than volatile memory. Storage memory MEM can further be configured for long-term storage of information. In some examples, storage memory MEM includes non-volatile storage elements. Examples of such non-volatile storage elements can include magnetic hard discs, optical discs, flash memories, or forms of electrically programmable memories (EPROM) or electrically erasable and programmable (EEPROM) memories.

Local interface 52, in some examples, includes a communications module. Local interface 52, in one example, utilizes the communications module to communicate with external devices via one or more networks, such as one or more wireless or wired networks or both. The communications module can be a network interface card, such as an Ethernet card, an optical transceiver, a radio frequency transceiver, or any other type of device that can send and receive information. Other examples of such network interfaces can include Bluetooth, 3G, 4G, and Wi-Fi 33 radio computing devices as well as Universal Serial Bus (USB).

If machine interface 14 includes a user interface, such a user interface, in some examples, can be configured to receive input from a user. Examples of such a user input interface can include a mouse, a keyboard, a microphone, a camera device, a presence-sensitive and/or touch-sensitive display, push buttons, arrow keys, or other type of device configured to receive input from a user. In an exemplary embodiment, user input communication from the user can be performed via a communications bus, such as, for example, a Controller Area Network (CAN) bus.

The user interface can be configured to provide output to a user. Examples of such a user interface can include a display device, a sound card, a video graphics card, a speaker, a cathode ray tube (CRT) monitor, a liquid crystal display (LCD), a light emitting diode (LED) display, an organic light emitting diode (OLED) display, or other type of device for outputting information in a form understandable to users or machines. In an exemplary embodiment, output communication to the user can be performed via a communications bus, such as, for example, a Controller Area Network (CAN) bus.

Figure 4:
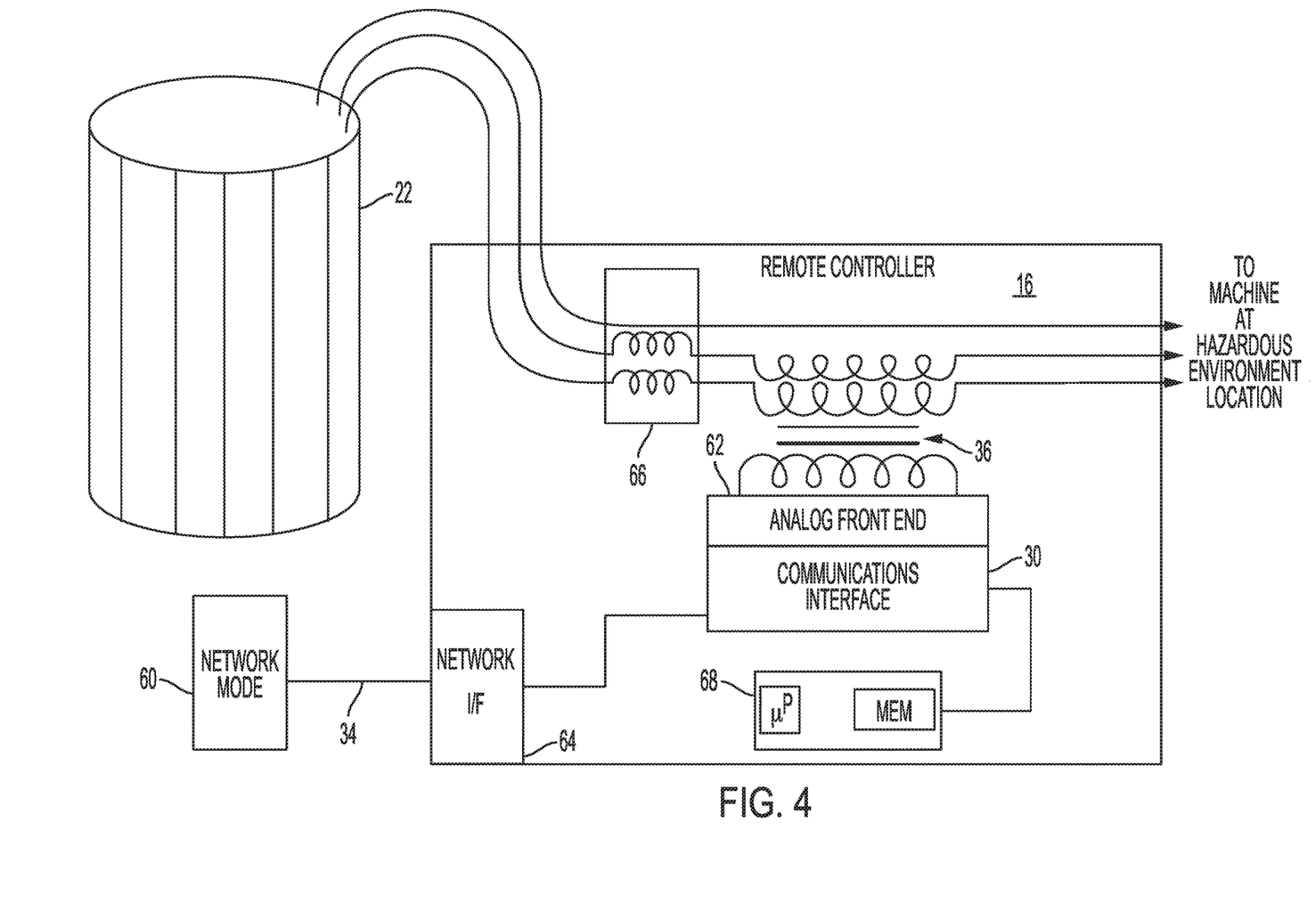
FIG. 4 is a block diagram of an embodiment of a system for remotely controlling, from a safe environment, a hazardous-environment-located machine.

FIG. 4 is a block diagram of an embodiment of a system for remotely controlling, from a safe environment, a hazardous-environment-located machine. In FIG. 4, remote controller 16 is electrically connected to both industrial-voltage power source 22 and machine controller 14 via industrial-voltage power-line conductors 20. Remote controller 16 is also connected to one or more network nodes 60 via industrial control network 34.

Remote controller 16 includes reactive coupler 36, communications interface 30, analog front-end filter 62, network interface 64, isolation filter 66, and local controller 68. Reactive coupler 36 is configured to reactively couple to industrial-voltage power-line conductors 20, which provide AC operating power of a line frequency to hazardous-environment-located machine 12. In some embodiments, industrial-voltage power-line conductors 20, also provide AC operating power to remote controller 16. analog front-end filter 62 filters out the line frequency of the AC high-voltage power provided to machine 12, while passing frequencies within the communications frequency band so as to pass machine command signals from communications interface 40. The machine control signals have frequencies within a communication frequency band. The communication frequency band does not include the line frequency of the AC operating power.

Communications interface 30 is configured to couple the machine control signals to industrial-voltage power-line conductor 20 via reactive coupler 36 and analog front-end filter 62. Communications interface 30 is further configured generate such machine command signals or to receive such machine command signals from one or more network nodes 60 via network interface 64. Network interface 64 provides network communications between network nodes 60 and remote controller 16.

Isolation filter 66 is configured to attenuate machine control signals transmitted by industrial-voltage power-line conductors 20 so that such machine control signals do not interfere with operation of other equipment to which AC operating power is provided by industrial-voltage power-line conductors 20. In the depicted embodiment, isolation filter 66 is a combination of an inductor or a Radio Frequency (RF) choke along with one or more capacitors.

Local controller 68 includes processor(s) μP and storage memory MEM. Processor(s) μP can receive program instructions from storage memory MEM. Processor(s) μP can be configured to machine interface 14, based on the received program instructions. For example processor(s) μP can be configured to send machine control signals to machine 12 in response to the received network control signals. Processor(s) μP also can be configured to receive information signals from machine interface 14 in response to information request signals sent by communications interface 30.

As illustrated in FIG. 4, remote controller 16 includes reactive coupler 36, communications interface 30, analog front-end filter 62, network interface 64, isolation filter 66, and local controller 68. However, in certain examples, remote controller 16 can include more or fewer components. For instance, remote controller 16 can also include a user interface.

Processor(s) μP, in one example, is configured to implement functionality and/or process instructions for execution within remote controller 16. For instance, processor(s) μP can be capable of processing instructions stored in storage memory MEM. Examples of processor(s) μP can include any one or more of a microprocessor, a controller, a digital signal processor(s) (DSP), an application specific integrated circuit (ASIC), a field-programmable gate array (FPGA), or other equivalent discrete or integrated logic circuitry. Processor(s) μP can be configured to control operation of remote controller 16 as well as controlling communications with network nodes 60.

Storage memory MEM can be configured to store information within remote controller 16 during operation. Storage memory MEM, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, storage memory MEM is a temporary memory, meaning that a primary purpose of storage memory MEM is not long-term storage. Storage memory MEM, in some examples, is described as volatile memory, meaning that storage memory MEM do not maintain stored contents when power to remote controller 16 is turned off. Examples of volatile memories can include random access memories (RAM), dynamic random access memories (DRAM), static random access memories (SRAM), and other forms of volatile memories. In some examples, storage memory MEM is used to store program instructions for execution by processor(s)μP. Storage memory MEM, in one example, is used by software or applications running on remote controller 16 (e.g., a software program implementing specific operations related to control of machine 12) to temporarily store information during program execution.

Storage memory MEM, in some examples, can also include one or more computer-readable storage media. Storage memory MEM can be configured to store larger amounts of information than volatile memory. Storage memory MEM can further be configured for long-term storage of information. In some examples, storage memory MEM includes non-volatile storage elements. Examples of such non-volatile storage elements can include magnetic hard discs, optical discs, flash memories, or forms of electrically programmable memories (EPROM) or electrically erasable and programmable (EEPROM) memories.

Network interface 60, in some examples, includes a communications module. Network interface 60, in one example, utilizes the communications module to communicate with external devices via one or more networks, such as one or more wireless or wired networks or both. The communications module can be a network interface card, such as an Ethernet card, an optical transceiver, a radio frequency transceiver, or any other type of device that can send and receive information. Other examples of such network interfaces can include Bluetooth, 3G, 4G, and Wi-Fi 33 radio computing devices as well as Universal Serial Bus (USB).

If remote controller 16 includes a user interface, such a user interface, in some examples, can be configured to receive input from a user. Examples of such a user input interface can include a mouse, a keyboard, a microphone, a camera device, a presence-sensitive and/or touch-sensitive display, push buttons, arrow keys, or other type of device configured to receive input from a user. In an exemplary embodiment, user input communication from the user can be performed via a communications bus, such as, for example, a Controller Area Network (CAN) bus.

The user interface can be configured to provide output to a user. Examples of such a user interface can include a display device, a sound card, a video graphics card, a speaker, a cathode ray tube (CRT) monitor, a liquid crystal display (LCD), a light emitting diode (LED) display, an organic light emitting diode (OLED) display, or other type of device for outputting information in a form understandable to users or machines. In an exemplary embodiment, output communication to the user can be performed via a communications bus, such as, for example, a Controller Area Network (CAN) bus.

Figure 5:
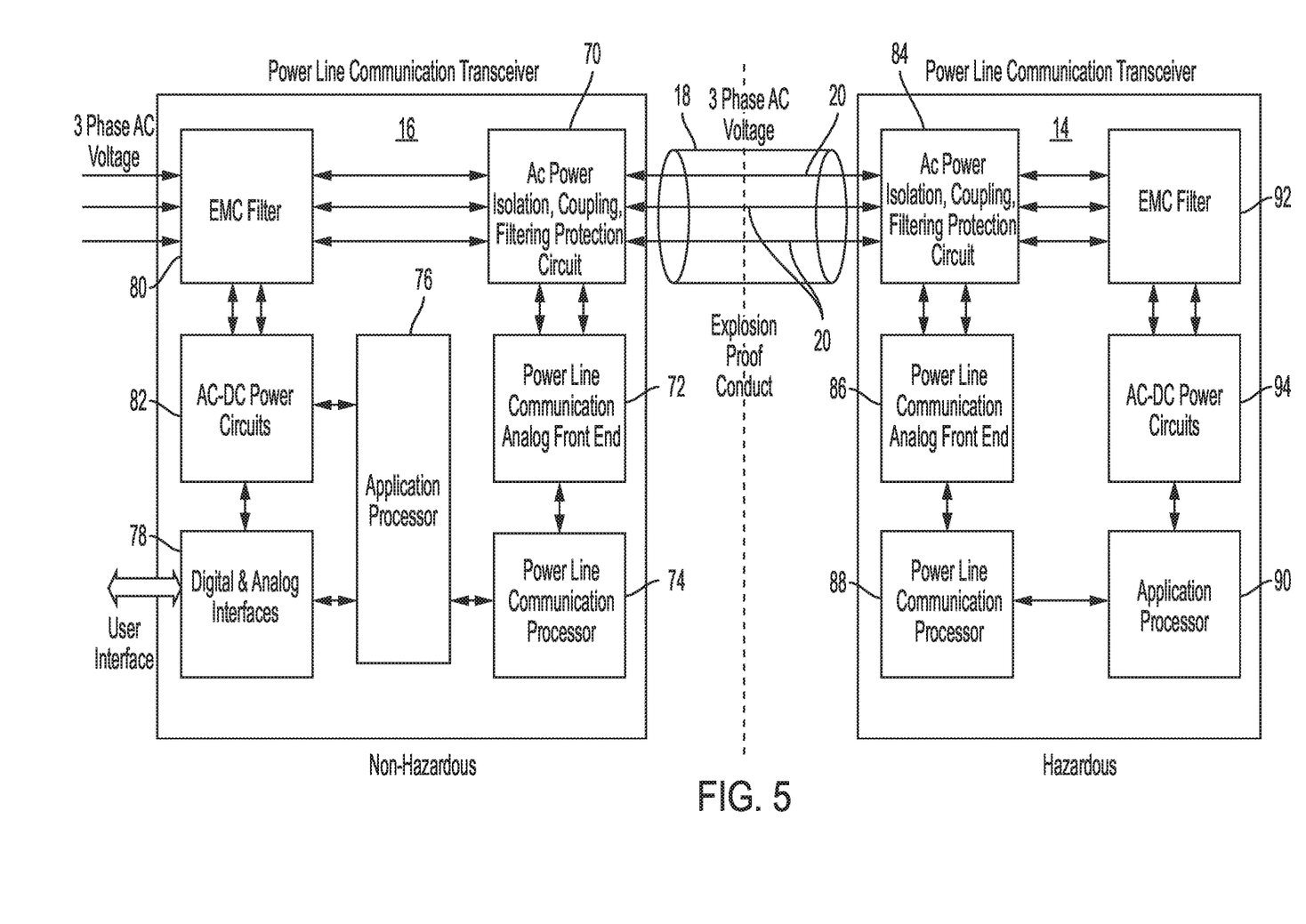
FIG. 5 is a block diagram of a machine interface located in a hazardous-environment connected via industrial-voltage power-line conductors to a remote controller located in a safe-environment area.

FIG. 5 is a block diagram of a machine interface located in a hazardous-environment connected via industrial-voltage power-line conductors to a remote controller located in a safe-environment area. In FIG. 5, machine interface 14 is in electrical communication with remote controller 16 via industrial-voltage power-line conductors 20. Such electrical communication can be one-way, such as from remote controller 16 to machine interface 14, or two-way. Remote controller 16 includes reactive interface 70, modulator/demodulator 72, communication processor 74, application processor 76, user interface 78, EMC filter 80, and power converter 82.

Reactive interface 70 includes reactive coupler 36 and isolation filter 66 (depicted in FIGS. 2 and 4). Reactive interface 70 is configured to transmit the modulated communication signal to modulator/demodulator 72 and to prevent such modulated communication signals from polluting the AC operating power signal delivered to other equipment. Modulator/demodulator 72 is configured to modulate communications signals to be transmitted by remote controller 16 and to demodulate communications signals received by remote controller 16. Demodulated or unmodulated signals are transmitted between modulator/demodulator 72 and communication processor 74, which in turn is in communication with application processor 76. Application processor 76 is configured to provide master control of remote controller 16.

User interface 78 is configured to communicate with a user providing user inputs to application controller 76 and providing outputs to a user from application controller 76. Power converter 82 is configured to provide all AC and/or DC power signals required by the various components 70-82 of remote controller 16. EMC filter 80 is configured to filter noise from industrial-voltage power-line conductors 20.

Machine interface 14 includes reactive interface 84, modulator/demodulator 86, communication processor 88, application processor 90, EMC filter 92, and power converter 94. Reactive interface 84 includes reactive coupler 38 and isolation filter 56 (depicted in FIGS. 2 and 3). Reactive interface 84 is configured to transmit the modulated communication signal to modulator/demodulator 86 and to prevent such modulated communication signals from polluting the AC operating power signal delivered to other equipment. Modulator/demodulator 86 is configured to modulate communications signals to be transmitted by machine controller 14 and to demodulate communications signals received by machine controller 14. Demodulated or unmodulated signals are transmitted between modulator/demodulator 86 and communication processor 88, which in turn is in communication with application processor 90. Application processor 90 is configured to provide master control of machine interface 14.

Power converter 94 is configured to provide all AC and/or DC power signals required by the various components 84-94 of machine interface 14. EMC filter 92 is configured to filter noise from industrial-voltage power-line conductors 20.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for interfacing with a hazardous-environment-located machine, the system comprising:
   an explosion-proof housing;
   a first reactive coupler within the explosion-proof housing, the first reactive coupler configured to reactively couple to an industrial-voltage power-line conductor providing AC operating power of a line frequency and control signals of frequencies within a communication frequency band to the hazardous-environment-located machine;
   a communications interface within the explosion-proof housing and electrically coupled to the first reactive coupler, the communications interface configured to receive the control signals from the industrial-voltage power-line conductor via the first reactive coupler, and to generate operating signals for the hazardous-environment-located machine based on the received control signals;
   a local interface electrically coupled to the communications interface and configured to couple to the hazardous-environment-located machine so as to provide the generated operating signals thereto;
   a remote controller configured to control the hazardous-environment-located machine from a safe-environment location, the remote controller including: a second communications interface configured to generate the control signals for the hazardous-environment-located machine
   and a second reactive coupler configured to reactively couple to the industrial-voltage power-line conductor providing the AC operating power of the line frequency to the hazardous-environment-located machine so as to transmit the generated control signals thereto.

2. The system of claim 1, wherein the hazardous-environment-located machine is an electric paint pump.

3. The system of claim 2, further comprising:
   the electric paint pump, wherein the explosion proof housing is integral to the electric paint pump.

4. The system of claim 2, wherein the control signals include at least one of a pump-speed command signal and a mode control signal.

5. The system of claim 1, further comprising:
   an electric paint agitator, wherein the explosion proof housing is integral to the electric paint agitator.

6. The system of claim 1, further comprising:
   an electric paint proportioner, wherein the explosion proof housing is integral to the electric paint proportioner.

7. The system of claim 1, wherein the communications interface is further configured to generate information signals, which are sent to a remote controller over the industrial-voltage power-line conductor via the first reactive coupler.

8. The system of claim 1, wherein the first reactive coupler is a transformer.

9. The system of claim 1, further comprising:
   an alarm-conditions sensor within the explosion-proof housing configured to sense an alarm condition of the hazardous-environment-located machine.

10. The system of claim 9, wherein the alarm-conditions sensor is further configured to generate an alarm signal in response to the alarm condition being sensed by the alarm-conditions sensor.

11. The system of claim 9, wherein the alarm condition is sensed based, at least in part, on the AC operating power provided to the hazardous-environment-located machine.

12. The system of claim 1, further comprising:
a local controller within the explosion-proof housing and having a processor and memory.

13. The system of claim 1, wherein the isolation filter includes an inductive element.

14. The system of claim 1, wherein the second reactive coupler is a transformer.

15. The system of claim 14, wherein the remote controller further comprises:
a network interface configured to couple to an industrial control network so as to receive control signals therefrom and to provide information signals thereto.

16. The system of claim 14, wherein the remote controller further comprises:
a user interface configured to couple to an industrial control network so as to receive control signals therefrom and to provide information signals thereto.

17. A system for interfacing with a hazardous-environment-located machine, the system comprising:
an explosion-proof housing;
a first reactive coupler within the explosion-proof housing, the first reactive coupler configured to reactively couple to an industrial-voltage power-line conductor providing AC operating power of a line frequency and control signals of frequencies within a communication frequency band to the hazardous-environment-located machine;
a communications interface within the explosion-proof housing and electrically coupled to the first reactive coupler, the communications interface configured to receive the control signals from the industrial-voltage power-line conductor via the first reactive coupler, and to generate operating signals for the hazardous-environment-located machine based on the received control signals;
a local interface electrically coupled to the communications interface and configured to couple to the hazardous-environment-located machine so as to provide the generated operating signals thereto;
a first isolation filter electrically coupled to the industrial-voltage power-line conductor between the first reactive coupler and the hazardous-environment-located machine, the isolation filter configured to pass the line frequency and to attenuate the frequencies within the communications frequency band; and
a second isolation filter configured to pass the line frequency and to attenuate the frequencies within the communications frequency band, the second isolation filter located between the second reactive coupler and an industrial-voltage power source, by which the AC operating power is provided.

18. The system of claim 17, wherein the communications interface is further configured to generate information signals, which are sent to a remote controller over the industrial-voltage power-line conductor via the first reactive coupler.

19. The system of claim 17, further comprising:
an alarm-conditions sensor within the explosion-proof housing configured to sense an alarm condition of the hazardous-environment-located machine.

20. The system of claim 17, wherein the remote controller further comprises:
a network interface configured to couple to an industrial control network so as to receive control signals therefrom and to provide information signals thereto.

* * * * *